United States Patent
Denoual et al.

(10) Patent No.: US 12,407,880 B2
(45) Date of Patent: Sep. 2, 2025

(54) METHOD AND APPARATUS FOR OPTIMIZING MEDIA CONTENT DATA ENCAPSUALTION IN LOW LATENCY APPLICATIONS

(71) Applicant: CANON KABUSHIKI KAISHA, Tokyo (JP)

(72) Inventors: Franck Denoual, Saint Domineuc (FR); Frédéric Maze, Langan (FR); Naël Ouedraogo, Val d'Anast (FR); Jean Le Feuvre, Gometz-le-Chatel (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/695,606

(22) PCT Filed: Sep. 20, 2022

(86) PCT No.: PCT/EP2022/076038
§ 371 (c)(1),
(2) Date: Mar. 26, 2024

(87) PCT Pub. No.: WO2023/052189
PCT Pub. Date: Apr. 6, 2023

(65) Prior Publication Data
US 2024/0397127 A1  Nov. 28, 2024

(30) Foreign Application Priority Data
Sep. 28, 2021  (GB) ...................... 2113875

(51) Int. Cl.
*H04N 21/235* (2011.01)
*H04N 21/845* (2011.01)
*H04N 21/854* (2011.01)

(52) U.S. Cl.
CPC ..... *H04N 21/2353* (2013.01); *H04N 21/8456* (2013.01); *H04N 21/85406* (2013.01)

(58) Field of Classification Search
CPC ........... H04N 21/2353; H04N 21/8456; H04N 21/85406
See application file for complete search history.

(56) References Cited

U.S. PATENT DOCUMENTS

2019/0037256 A1*  1/2019  Denoual ............ H04N 21/8456

FOREIGN PATENT DOCUMENTS

| GB | 2575074 A | 1/2020 |
| WO | 2017/140939 A1 | 8/2017 |

(Continued)

OTHER PUBLICATIONS

ISO/IEC, "Information technology—Dynamic adaptive streaming over HTTP (DASH)—Part 1: Media presentation description and segment formats", May 15, 2014, ISO/IEC, pp. 1-144 (Year: 2014).*

Primary Examiner — Nicholas T Corbo
(74) Attorney, Agent, or Firm — Canon U.S.A., Inc. IP Division

(57) ABSTRACT

At least one embodiment of a method for encapsulating media data as fragments, each fragment comprising metadata and media data, the metadata describing encapsulation of the media data. After having obtained second media data to be encapsulated within a second fragment and second metadata describing encapsulation of the second media data, it is determined whether some of the second metadata are identical to some of first metadata belonging to a first fragment and describing encapsulation of first media data within the first fragment. If it is the case and if the second fragment is not to be parsed independently, the second media data and a portion of the second metadata are encapsulated within the second fragment, the second fragment further comprising an indication to signal that the metadata part of the second fragment comprises only a portion of the metadata required to parse the media data of the second fragment.

19 Claims, 7 Drawing Sheets

(56) References Cited

FOREIGN PATENT DOCUMENTS

WO  2020/002122 A1  1/2020
WO  2020/182526 A1  9/2020

\* cited by examiner

METHOD AND APPARATUS FOR OPTIMIZING MEDIA CONTENT DATA ENCAPSUALTION IN LOW LATENCY APPLICATIONS

CROSS REFERENCE TO RELATED APPLICATION

This application is the National Phase application of PCT Application No. PCT/EP2022/076038, filed on Sep. 20, 2022. This application claims the benefit under 35 U.S.C. § 119 (a)-(d) of United Kingdom Patent Application No. 2113875.5, filed on Sep. 28, 2021 and entitled "METHOD, DEVICE, AND COMPUTER PROGRAM FOR OPTIMIZING MEDIA CONTENT DATA ENCAPSUALTION IN LOW LATENCY APPLICATIONS". The above cited patent applications are incorporated herein by reference in its entirety.

FIELD OF THE INVENTION

The present invention relates to a method, a device, and a computer program for improving encapsulating and parsing of media data, making it possible to improve encapsulation of media content data in low latency applications.

BACKGROUND OF THE INVENTION

The ISO base media file format (ISOBMFF, also called file format) is a general format forming the basis for a number of other more specific file formats. ISOBMFF is standardized by the International Standardization Organization as ISO/IEC 14496-12. This format contains characteristics of media data like timing, size or media information for timed sequences of media data, such as audio-visual presentations. These characteristics are generally referred to as metadata (or structure-data), in opposition to media data (or data). An ISO Base media file (also referred to as media file or movie file or media presentation) may come as one file containing the whole presentation or as multiple segment files, each segment containing a temporal portion of the presentation. An ISO Base media file is structured into "boxes", each of which being identified by a four-character code, also denoted FourCC or 4CC. In the file format, the overall presentation is called a movie. It is logically divided into tracks wherein each track represents a timed sequence of media (for example a timed sequence of video frames). Within each track, each timed unit is called a sample. Each track has one or more sample descriptions. Each sample in the track is tied to a description by reference. All the structure-data or metadata, including that defining the placement and timing of the media, is contained in structured boxes. The media data (frames of video or samples of audio, for example) is referred to by this structure-data or metadata. The overall duration of each track is defined in the structure-data. Each sample has a defined duration. The exact decoding timestamp of a sample is defined by summing the duration of the preceding samples.

FIG. 1 illustrates an example of encapsulated media data temporally organized as a fragmented presentation in one or more media files according to the ISO Base Media File Format.

Media data encapsulated in a media file 100 starts with a FileTypeBox ('ftyp') box (101) providing a set of brands identifying the precise specifications to which the encapsulated media data conform, that are used by a reader to determine whether it can process the encapsulated media data. The 'ftyp' box is followed by a MovieBox ('moov') box referenced 105. The MovieBox box provides initialization information that is needed for a reader to initiate processing of the encapsulated media data. In particular, it provides a description of the presentation content, the number of tracks, and information regarding their respective timelines and characteristics. For the sake of illustration, the MovieBox box may indicate that the presentation comprises one track having an identifier track_ID equal to 1.

A fragmented ISO Base Media File 100 is a set of media segment files in which the MovieBox ('moov') box 105 does not contain the information for the full duration of the movie. In particular, it may have few or no samples in its tracks (tracks being described by 'trak' box 135). To this minimal or empty movie, extra samples are added, in structures called movie fragments (e.g. movie fragments 100-1 and 100-2), described by a hierarchy of boxes, mainly a pair of 'moof' box (e.g. 'moof' box 110 or 120) and 'mdat' box (e.g. 'mdat' box 115 or 125). Each movie fragment comprises metadata stored in a MovieFragmentBox ('moof') box (and its sub-boxes) and media data stored in a MediaDataBox ('mdat') box (or in an identified media data box 'imda'). Presence or absence of movie fragments in a media file is indicated early in the file by the MovieExtendsBox ('mvex') box 130. When present, information contained in this box warns readers that there might be subsequent movie fragments and that these movie fragments must be found and scanned in the given order to obtain all the samples of a track. To that end, information contained in this box should be combined with other information of the MovieBox box. MovieExtendsBox box 130 may contain an optional MovieExtendsHeaderBox ('mehd') box and one TrackExtendsBox ('trex') box per track defined in MovieBox 'moov' box 105. When present, the MovieExtendsHeaderBox box provides the overall duration of a fragmented movie. Each TrackExtendsBox box defines default parameter values for the description of the samples (type, size, duration, control flags, etc.) of the track fragment.

For the sake of illustration, media file 100 comprises a first movie fragment 100-1 containing and describing samples 1 to N of a track identified with track_ID equal to 1 (as indicated in the 'tfhd' box). This first movie fragment 100-1 is composed of 'moof' box 110 and of 'mdat' box 115. Still for the sake of illustration, media file 100 comprises a second movie fragment 100-2 containing and describing samples N+1 to N+M of the track identified with track_ID equal to 1. Like the first movie fragment, second movie fragment 100-2 is composed of a 'moof' box (referenced 120) and of a 'mdat' box (referenced 125).

Encapsulated media data may be fragmented in a single media file or into a plurality of media segment files (referred to as segment files). When encapsulated into a plurality of segment files, the FileTypeBox and MovieBox boxes (also denoted initialization fragments in the following) are contained within an initial segment file (also denoted an initialization segment), in which the one or more tracks do not contain any sample. Subsequent segment files contain one or more movie fragments like movie fragment 100-1 and movie fragment 100-2. These one or more movie fragments may constitute an ISOBMFF segment, a DASH segment, DASH media segment, or a CMAF fragment.

The use of movie fragments is particularly relevant for live encoding and live packaging, because this encapsulation mode requires less buffering capacities for encapsulation modules. This is also relevant for low-latency streaming, for example for adaptive streaming over HTTP like DASH or HLS (HTTP Live Streaming), because encoded media can be available as soon as a movie fragment is encoded and encapsulated.

Movie fragments such as movie fragments 100-1 and 100-2 have a box hierarchy that differs from the box hierarchy under a 'moov' box. Likewise, track fragments (described in TrackFragmentBox ('traf') box, for example 'traf' boxes 111 and 121) have a box hierarchy that differs from the TrackBox box (for example from 'trak' box 135). As illustrated, TrackBox box 135 contains in its box hierarchy a SampleTableBox ('stbl') box that in turn contains descriptive and timing information of the media samples of the track. It is noted that in the case according to which media file 100 is fragmented, it may have no sample described in the boxes under the SampleTableBox ('stbl') box, like the boxes providing sample size or timing information. However, the SampleTableBox ('stbl') box contains a SampleDescriptionBox ('stsd') box containing one or more SampleEntry boxes giving descriptive information about the coding format of the samples (the coding format being identified with a specific 4CC, as illustrated with 'xxxx' characters), and initialization information needed for configuring a decoder according to the coding format.

For the sake of illustration, a SampleEntry box having a four-character type set to 'vvc1' or 'vvi1' signals that the associated samples contain media data encoded according to the Versatile Video Coding (VVC) format and a SampleEntry box having a four-character type set to 'hvc1' or 'hev1' signals that the associated samples contain media data encoded according to the High Efficiency Video Coding (HEVC) format. The SampleEntry box may contain other boxes containing information that applies to all samples associated with this SampleEntry box. Samples are associated with a SampleEntry box via the sample_description_index parameter either in a SampleToChunkBox ('stsc') box in the SampleTableBox ('stbl') box in the case according to which the media file is a non-fragmented media file, or otherwise in a TrackFragmentHeaderBox ('tfhd') box in a TrackFragmentBox ('traf') box of the MovieFragmentBox ('moof') box or in a TrackExtendsBox ('trex') box in a MovieExtendsBox ('mvex') box when the media file is fragmented. According to ISO Base Media File Format, all tracks and all sample entries in a presentation are defined in a 'moov' box, for example 'moov' box 105, and cannot be declared later on during the presentation.

In movie fragments, the samples are mainly described within a TrackFragmentHeaderBox ('tfhd') box possibly providing default sample entry (type of codec in use and coding configuration information), default sample size, and/or default sample duration. The actual sample size, duration, offsets in the media data part, or flags (in the case according to which these values are different from the default values or in the case according to which no value is defined by default) may be indicated in a TrackRunBox ('trun') box for sample description. A TrackRunBox ('trun') box documents a contiguous set (a run) of samples for a track in the movie fragment.

For example, regarding sample timing, a track fragment may contain a TrackFragmentBaseMediaDecodeTimeBox ('tfdt') box providing the absolute decoding timestamps (using a baseMediaDecodeTime parameter), measured on the decoding timeline, of the first sample in decoding order in the track fragment. For random access or synchronization, a track fragment may have an indication of a decoding time in the 'tfdt' box. When this box is present, it is not necessary for a player or a reader to sum the sample durations of all preceding samples in previous fragments to find this value. For example, the MPEG DASH specification mandates this box to be present in each 'traf' box of a media segment in live profile for ISOBMFF. A 'moof' box may contain one or more 'traf' boxes, for example multiplexing audio and video track fragments in a same media data box. Some specification based on ISOBMFF may constrain a media file or segment files to contain one 'traf' box per 'moof' box.

It is also noted that ISOBMFF and its extensions comprise several grouping mechanisms to group together tracks, static items, or samples and to associate a group description with a group. A group typically shares common semantic and/or characteristics. For example, MovieBox ('moov') box 105 and/or MovieFragmentBox ('moof') boxes 110 and 120 may contain sample groups associating properties to groups of samples for a track or for a track fragment. The sample groups characterized by a grouping type may be defined by two linked boxes, a SampleToGroupBox ('sbgp') box that represents the assignment of samples to sample groups and a SampleGroupDescriptionBox ('sgpd') box that contains a sample group entry for each sample group describing the properties of the group.

The Common Media Application Format (CMAF) is standardized as ISO/IEC 23000-19. It is built on top of ISOBMFF, especially on ISOBMFF segments, as a generic container for streaming delivery of multimedia presentations. For example, a same CMAF presentation may be described by different manifests like the MPD of MPEG DASH or the playlists in HTTP Live Streaming.

CMAF is codec agnostic and defines several profiles for audio, video, subtitles, etc. depending on the codec in use and on the type of application. For example, CMAF provides guidelines on the settings for CMAF fragments when a target application is low latency streaming. This is often a trade-off between encoding delay and buffering constraints and bitrate efficiency: the longer a CMAF Fragment, the bigger should be the reception buffer and probably the latency, but the more efficient may be the compression (avoiding encoding of intra-coded frames like IDR, CRA frames in MPEG video codecs, i.e. frames without coding dependencies to preceding encoded frames).

FIG. 2 illustrates a CMAF segment, addressable from a streaming manifest, and its relation with ISOBMFF movie fragments. A CMAF segment such as CMAF segment 200 typically has a duration of few seconds (e.g. 2 to 10 seconds) and may contain one or more consecutive CMAF fragments of a same track. A CMAF fragment corresponds to encoded ISOBMFF media segments with some specific constraints.

In the example illustrated in FIG. 2a, CMAF segment 200 contains a single CMAF fragment referenced 205 made up of 'moof' box 210 and 'mdat' box 215. For the sake of illustration, 'mdat' box 215 comprises video samples like 220-1, 220-6, and 220-10. Still according to the illustrated example, the first sample (i.e. sample 220-1) corresponds to a random-access point, or stream access point, or stream switching point in the video stream. This access point can be used to start the presentation from a given time, to seek in the presentation, to change resolution or bitrate, to switch for streaming adaptation, etc. It is observed that while the samples illustrated in FIG. 2 correspond to video samples, the same organization may also apply to other types of media streams (e.g. audio, subtitles, etc.).

As illustrated in FIG. 2b, a CMAF fragment may contain several CMAF chunks. According to the illustrated example, CMAF fragment 205' comprises three CMAF chunks referenced 250-1 to 250-3. Still according to this example, each of the CMAF chunks comprises a set of contiguous samples, covering a given period of time that may vary from one chunk to another. As illustrated, each CMAF chunk is actually built like a movie fragment and comprises a 'moof' box and a 'mdat' box. For example, CMAF chunk 250-1 comprises 'moof' box 255-1 and a 'mdat' box 260-1.

The first CMAF chunk of a CMAF Fragment (e.g. CMAF chunk 250-1) may be constrained to be addressable (e.g. associated to a URL or to a URL template) or to start with an adaptive switching point. This reduces the streaming latency because instead of waiting for a whole CMAF segment (like segment 200 in FIG. 2*a*) to be encoded, packaged, and transmitted, a client has to wait for a single CMAF chunk to be encoded, packaged and transmitted. In other words, a client should only wait for a CMAF chunk to be available to request it, without waiting anymore for a whole segment to be ready.

The CMAF chunks follow the ISOBMFF rules on movie fragments with additional constraints like, for example, one 'traf' box per movie fragment with only one 'trun' box, a mandatory 'tfdt' per track fragment, and, depending on the use cases, additional boxes (e.g. SampleAuxiliaryInformationOffsetsBox 'saio' or SampleAuxiliaryInformationSizesBox ('saiz') box or 'seig' sample group description (CencSampleEncryption group)) describing the encryption.

While the ISOBMFF file format has proven to be efficient, there is a need to improve encapsulation efficiency in particular to reduce the encapsulation metadata overhead and latency. Indeed, while media streaming is optimized by compressing more and more media streams (through improvement of audio or video codecs), the encapsulation cost in terms of description is often ignored.

SUMMARY OF THE INVENTION

The present invention has been devised to address one or more of the foregoing concerns.

According to a first aspect of the invention, there is provided a method for encapsulating media data as a plurality of fragments of one or more media files, each of the fragments comprising a metadata part and a media data part, metadata of the metadata part describing encapsulation of the media data in the media data part, the method being carried out by a server and comprising:
  obtaining second media data to be encapsulated within a second fragment,
  obtaining second metadata describing encapsulation of the second media data,
  determining that some of the second metadata describing encapsulation of the second media data are identical to some of first metadata belonging to a first fragment and describing encapsulation of first media data within the first fragment, and
  if some of the second metadata describing encapsulation of the second media data are identical to some of the first metadata describing encapsulation of the first media data and if the second fragment is not to be parsed independently, encapsulating the second media data and a portion of the second metadata within the second fragment, the second fragment further comprising an indication to signal that the metadata part of the second fragment comprises only a portion of the metadata required to parse the media data of the second fragment Accordingly, the method of the invention makes it possible to optimize fragmented encapsulation of media data, enabling to decrease the encapsulation metadata overhead. It allows fragmentation suitable for low latency media streaming saving some bitrate compared to known movie fragments (for example from 3 to 5 kilo-bits per second for encrypted video where information is duplicated for encryption key exchange from one fragment to another).

According to some embodiments, the method further comprises determining that the second fragment is not to be parsed independently, determining that the second fragment is not to be parsed independently being based on fragment duration.

According to some embodiments, the fragment duration is determined as a function of a latency for a client to receive fragments.

According to some embodiments, the fragment duration is determined as a function of synchronization points for decoding the encapsulated media data.

According to some embodiments, determining that the second fragment is not to be parsed independently further comprises comparing a timing item of information of the second media data with timing item of information of previously encapsulated media data.

According to some embodiments, the timing item of information of the second media data and of previously encapsulated media data are compared with a threshold to control positions of random-access points, stream access points, or stream switching points within media data.

According to some embodiments, the first and second metadata are stored in 'moof' boxes as defined in ISOBMFF.

According to some embodiments, the indication is stored as a version of a structure of the metadata part of the second fragment.

According to some embodiments, the fragments are Common Media Application Format, CMAF, chunks.

According to some embodiments, the first and the second fragments belong to a same media file.

According to a second aspect of the invention, there is provided a method for parsing encapsulated media data, the media data being encapsulated as a plurality of fragments of one or more media files, each of the fragments comprising a metadata part and a media data part, metadata of the metadata part describing encapsulation of the media data in the media data part, the method being carried out by a client and comprising:
  obtaining a first fragment comprising first media data and first metadata,
  parsing the first media data as a function of the first metadata,
  obtaining a second fragment comprising second media data and second metadata, the second fragment further comprising an indication to signal that the metadata part of the second fragment comprises only a portion of the metadata required to parse the media data of the second fragment, and
  upon determining that the second fragment cannot be parsed independently, parsing the second media data as a function of the first metadata and of the second metadata.

Accordingly, the method of the invention makes it possible to optimize fragmented encapsulation of media data, enabling to decrease the encapsulation metadata overhead. It allows fragmentation suitable for low latency media streaming saving some bitrate compared to known movie fragments (for example from 3 to 5 kilo-bits per second for encrypted video where information is duplicated for encryption key exchange from one fragment to another).

According to some embodiments, the method further comprises resetting current metadata describing encapsulation of media data if encapsulated media data to parse belong to a fragment that can be parsed independently.

According to some embodiments, the method further comprises replacing a subset of metadata describing encapsulation of media data if current encapsulated media data to parse belong to a fragment that cannot be parsed independently.

According to some embodiments, the first and second metadata are stored in 'moof' boxes as defined in ISOBMFF.

According to some embodiments, the indication is stored as a version of a structure of the metadata part of the second fragment.

According to some embodiments, the fragments are Common Media Application Format, CMAF, chunks.

According to some embodiments, the first and the second fragments belong to a same media file.

According to other aspects of the invention, there is provided a processing device comprising a processing unit configured for carrying out each step of the methods described above. The other aspects of the present disclosure have optional features and advantages similar to the first and second above-mentioned aspects.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer-readable code for provision to a programmable apparatus on any suitable carrier medium. A tangible carrier medium may comprise a storage medium such as a floppy disk, a CD-ROM, a hard disk drive, a magnetic tape device or a solid-state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION OF THE INVENTION

Figure 1:
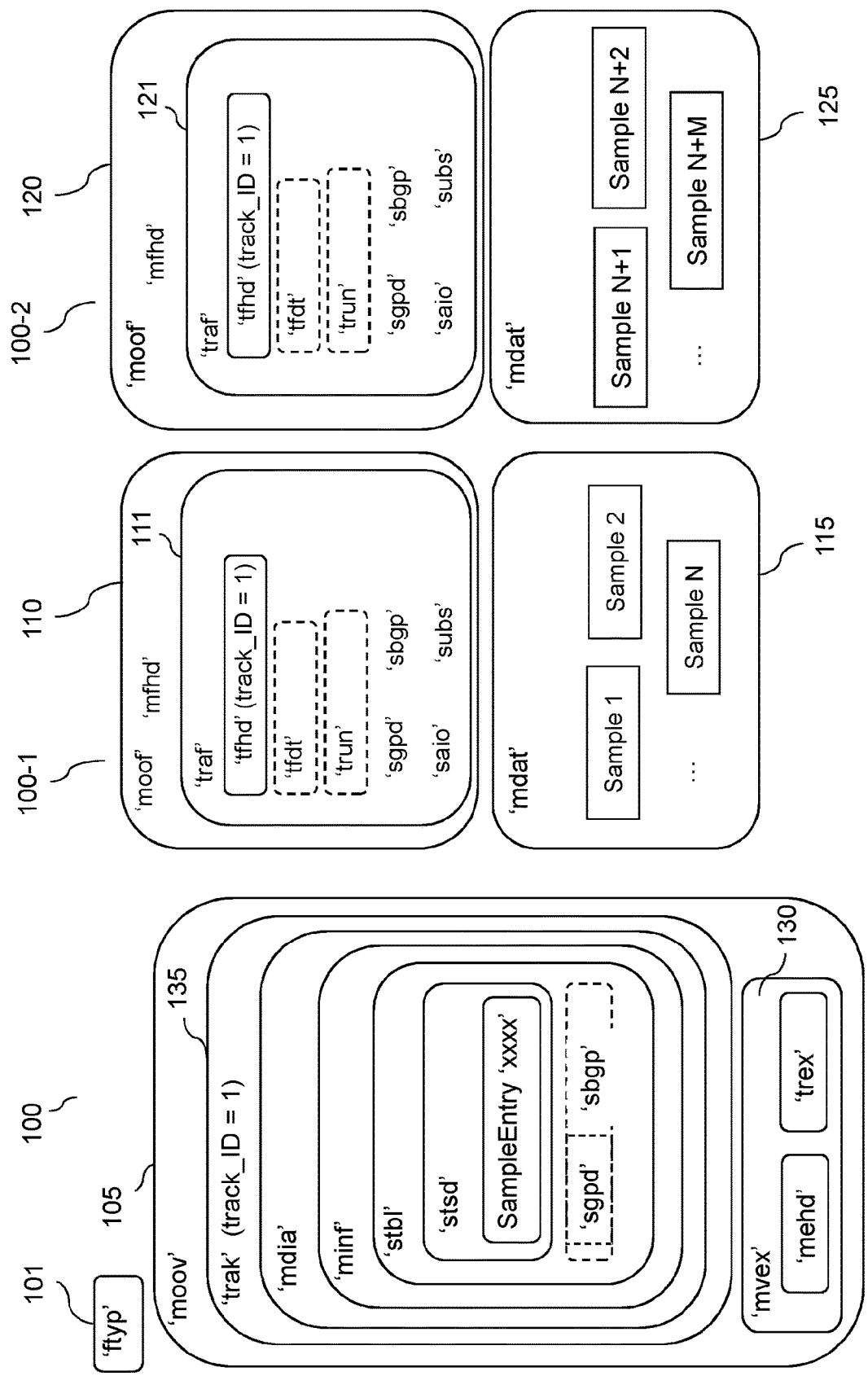
FIG. 1 illustrates an example of encapsulated media data temporally organized as a fragmented presentation in one or more media files according to the ISO Base Media File Format.
Figure 2:
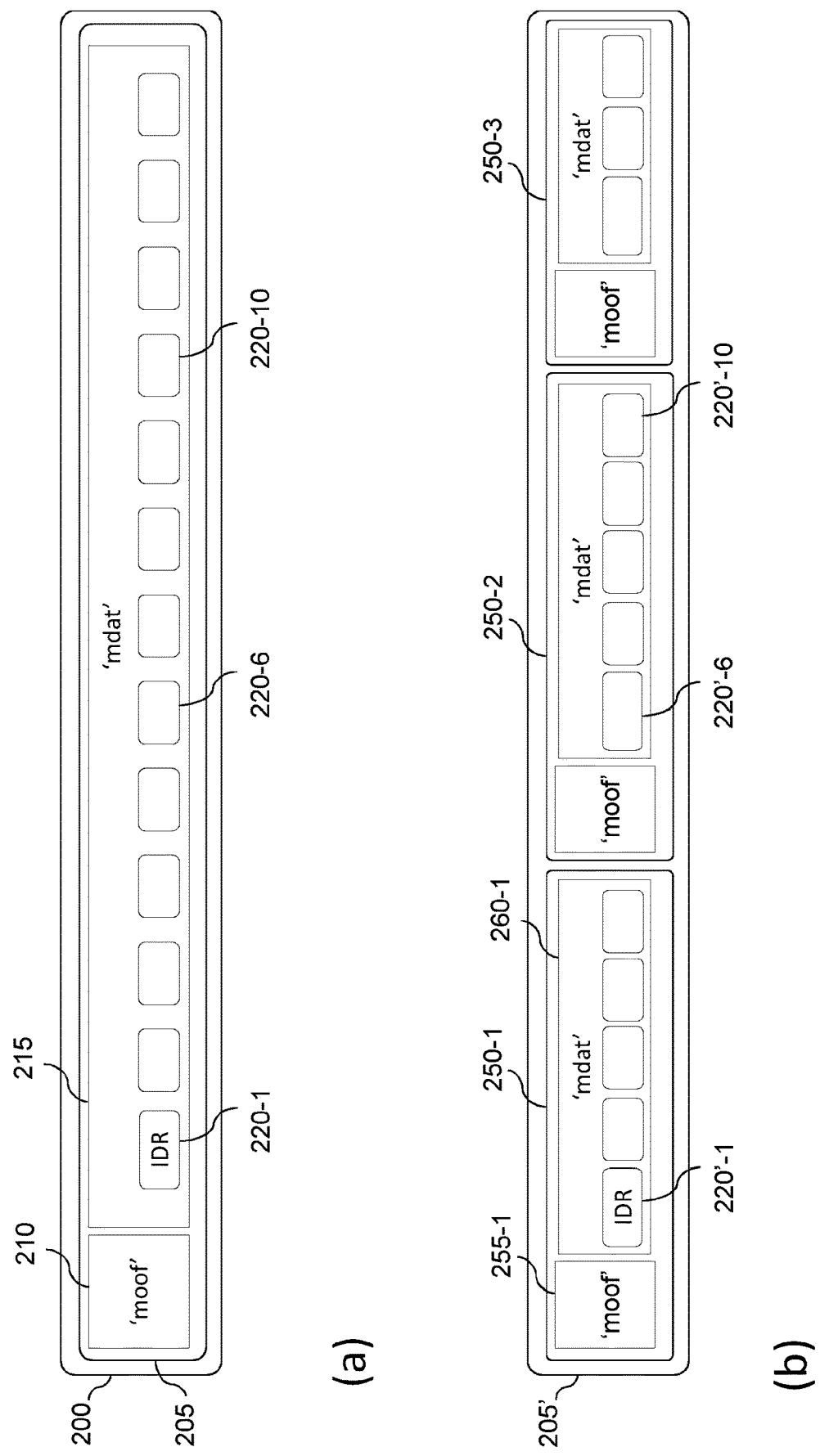
FIG. 2 illustrates a CMAF segment, addressable from a streaming manifest, and its relation with ISOBMFF movie fragments.

According to some embodiments of the invention, the content of some 'moof' boxes of fragmented ISOBMFF media data is optimized to reduce redundancy. Indeed, it has been observed that each movie fragment according to ISOBMFF is independent from any previous movie fragments, even if only some of them contain random-access points, as can be seen in FIG. 2b where the only random-access point in the CMAF presentation is the first sample referenced 220'-1 (an IDR frame in the example) in CMAF chunk 250-1. Accordingly, from a CMAF chunk to another or from a movie fragment to another, there may be redundant metadata that could be avoided (reducing, for example, the bitrate required for transmitting the media stream), it being noted that the shorter become the CMAF chunks or movie fragments, for example for low latency streaming, the higher becomes the description cost (that may represent kilo-bits per second overhead). It is to be noted that this would be also the case in a fragmented ISOBMFF, independently of the CMAF use case.

According to some embodiments, a new kind of movie fragment is created to inherit information from previous movie fragments. Existing optimization for movie fragments (defined as default values) are preserved.

Figure 3:
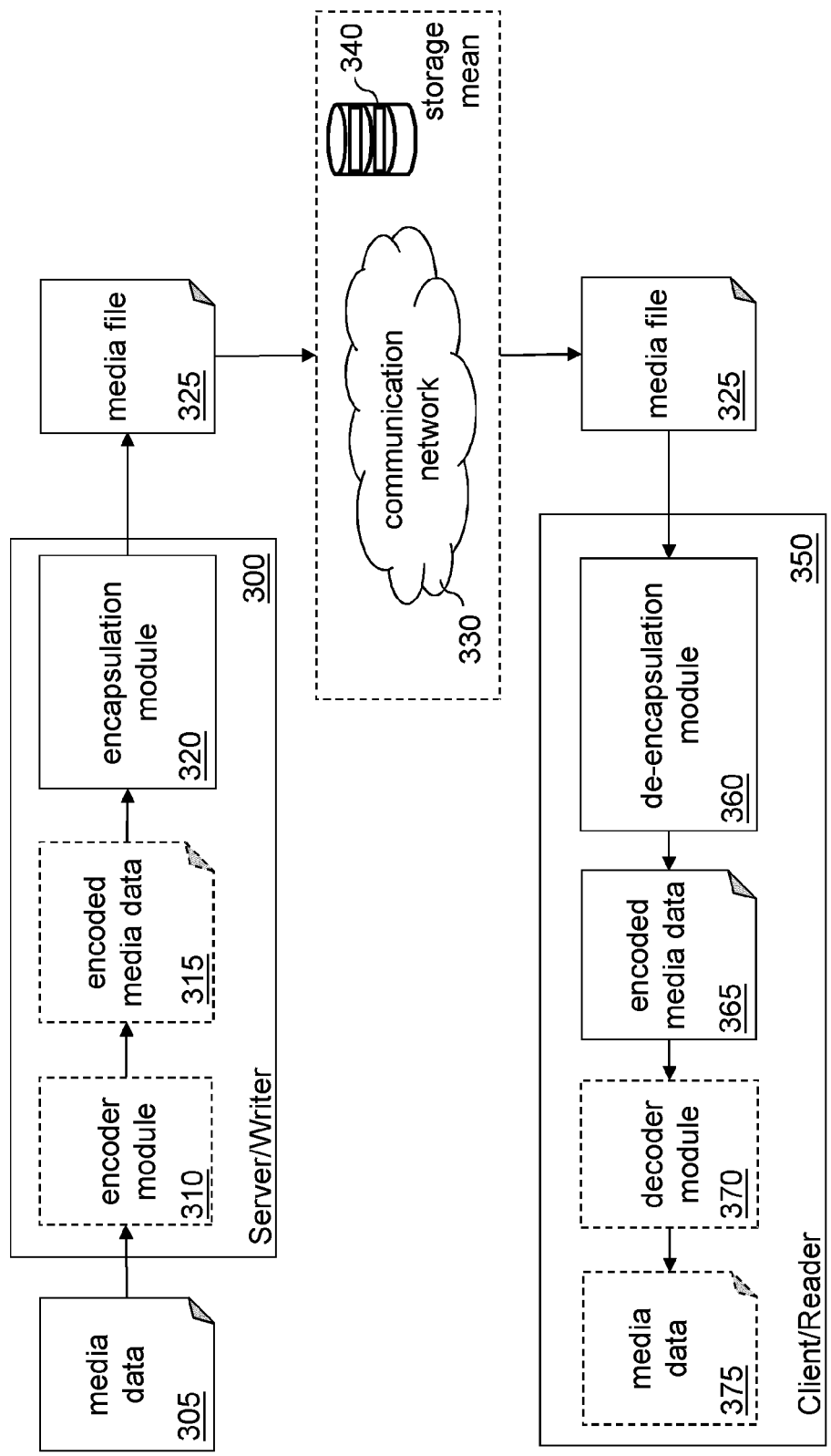
FIG. 3 illustrates an overview of a method for encapsulating or storing multimedia presentations according to some embodiments of the invention.

FIG. 3 illustrates an overview of a method for encapsulating or storing multimedia presentations according to some embodiments of the invention. The media data to be encapsulated or stored, referenced 305, can be video, spatial sub-part of a video, audio, volumetric visual media, subtitles, or a combination of such elementary streams. They are encapsulated into a media file or into media segment files 325 in a way that allows adaptive streaming over HTTP, possibly with low latency. As illustrated, a server 300 comprises an encapsulation module 320 (also called ISOBMFF writer or simply writer) and optionally a streaming manifest generation module (not represented). The server 300 may be connected, via a network interface (not represented), to a communication network 330 to which is also connected, via a network interface (not represented), a client 350. An example of client is a media player on a PC, tablet, TV or smartphone.

Server 300 processes media data 305 to prepare it for streaming or for storage, this is called encapsulation. It mainly consists in adding metadata describing the media data in terms of kinds of data, codec in use, size, data offsets, timing, etc. As mentioned above, media data 305 may correspond to audio presentation or video presentation of both, possibly with subtitles or timed text. Media data 305 may be the raw data captured by sensors or generated by a content creator or editing tools. Media data 305 may be available as compressed or encoded media data 315, possibly according to different encoded versions. This means that the encoding or compression may be performed by the server itself with an encoder module like encoder module 310 (possibly one per media type) or remotely from the server. The compression may be live encoding (as well as the encapsulation).

Media data 305 may also be encapsulated media data, these media data being encapsulated in a way that is not suitable for low-latency streaming, for example as non-fragmented tracks. In the latter case, the encapsulation module (e.g encapsulation module 320) also contains a reader part to de-encapsulate the media data and then encapsulate de-encapsulated media data, according to some embodiments of the invention.

According to the illustrated example, encapsulation module 320 of server 300 is used to encapsulate the media data into movie fragments, for example according to ISOBMFF and its extensions (e.g. CMAF, NAL-unit based File Format, etc.). Server 300 then generates a media file referenced 325 or one or more segment files 325. The server 300 may optionally generate a streaming manifest like a DASH MPD or HLS playlist (not represented). The generated file, segment files, or manifest may be stored in a remote storage device, for example in a remote storage device accessible through network 340, for redistribution via on-demand or live streaming.

According to some embodiments of the invention, encapsulation module 320 generates an encapsulation file (or segments) allowing low-latency and adaptive streaming over HTTP.

Client 350 is used for processing data received from communication network 330, or read from a (local or remote) storage device, for example for processing media file or media segments 325. The data may be streamed to the client, thus involving a streaming module (not represented) in charge of parsing a streaming manifest, of determining requests to fetch the media streams, and of adapting the transmission, according to indication in the manifest and client parameters like for example available bandwidth, CPU, application needs, or user preference.

The received data is de-encapsulated in de-encapsulation module 360 (also known as a ISOBMFF parser, ISOBMFF reader, or simply parser or reader), the de-encapsulated data (or parsed data) may be decoded by a decoding module for storage display or for output to an application or to user(s). The decoder module (possibly one or more per media type) may be part of the client, may be an external module, or may be a dedicated hardware. The de-encapsulated data may correspond to encoded media data 365 (e.g. video bitstream, audio bitstream, etc.).

The de-encapsulation, decoding, and rendering may be live operations processing the media file as soon as it is received, for example by processing data chunks for each media stream in parallel and in synchronization to minimize the latency between the recorded multimedia presentation (as media data 305) and its visualization by user(s) as media data 375 for example onto his/her device's screen.

Client or server may be user devices but may also be network nodes acting on the media files being transmitted or stored. Server or client may only contain, respectively, the encapsulation and de-encapsulation parts.

It is noted that media file 325 may be communicated to client or reader 350 in different ways. In particular, server or writer (or packager) 300 may generate media file 325 with a media description (e.g. a DASH MPD) and communicate (or stream) it directly to client 350 upon receiving a request from client 350. Media file 325 may also be downloaded, at once or progressively, by and stored in client 350.

For the sake of illustration, media file 325 may encapsulate media data into boxes according to the ISO Base Media File Format (ISOBMFF, ISO/IEC 14496-12) and its derived specifications (e.g. Carriage of NAL unit structured video in the ISOBMFF, ISO/IEC 14496-15 or Common Media Application Format, CMAF ISO/IEC 23001-19). In such a case, media file 325 may correspond to one or more media files (indicated in a FileTypeBox ('ftyp') box or in a SegmentTypeBox ('styp') box). According to ISOBMFF, media file 325 may include two kinds of boxes, one or more "media data boxes" (e.g. 'mdat' or 'imda' boxes), containing the media data, and "metadata boxes" (e.g. 'moov' or 'moof' boxes) containing metadata defining placement and timing of the media data. The media file or segment files contain movie fragments. The media data box(es) contain all the data of media data 305 or encoded media data 315. There may be one media data box multiplexing media data but there may also be one or more media data boxes, for example one per media type and possibly one or more per movie fragment.

Figure 4:
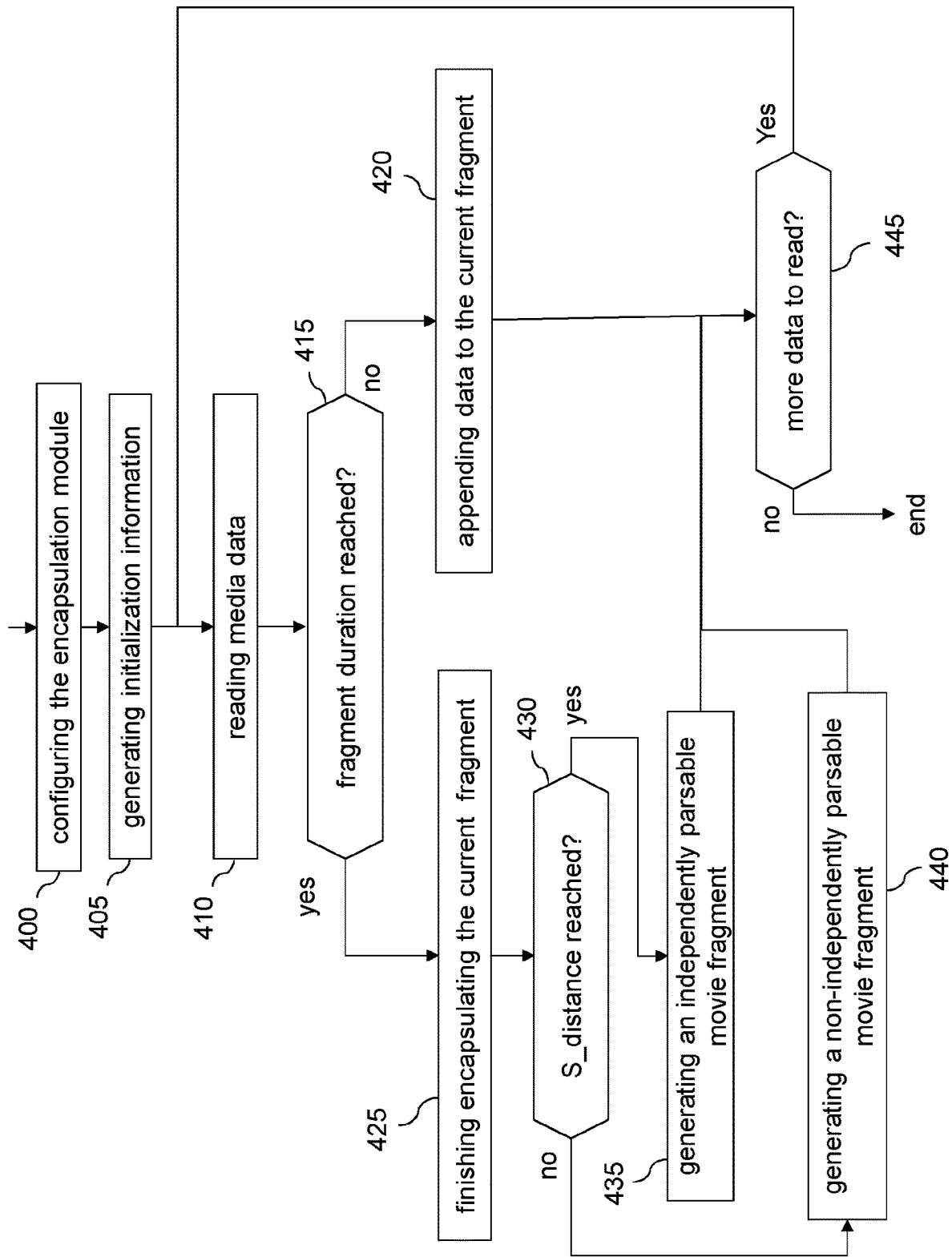
FIG. 4 illustrates an example of steps of an encapsulation process according to some embodiments of the invention.

FIG. 4 illustrates an example of steps of an encapsulation process according to some embodiments of the invention. Such steps may be carried out by an encapsulation module such as encapsulation module 320 in FIG. 3.

As illustrated, a first step is directed to configuring the server (step 400). More precisely, configuration step 400 may be directed to the configuration of an encapsulation module (e.g. encapsulation module 320 in FIG. 3) and an encoder module (e.g. encoder module 310 in FIG. 3) or of an encapsulation module only if encoder settings cannot be controlled, for example in the case where the configuration is hard-coded. For the sake of illustration, the configuration step may consist in setting a number of tracks, for example one per media stream, each media stream possibly corresponding to an encoded version of each media type (audio, video, volumetric, subtitle, etc.) composing the media presentation. The configuration may also consist in defining a granularity of random-access points in the presentation (for example, every second or every 2 seconds) and possibly, for streaming application, the switching points and the addressable objects (or addressable media objects) in the presentation (for example a DASH media segment, a CMAF segment, CMAF fragment, or CMAF chunk). In addition, the configuration step may collect information related to the encoders in use.

The configuration may also impact encoder settings, for example (while considering video streams) the length of groups of pictures (GOP) and the positions of resynchronization points like position of Intra, IDR, or CRA frames, the use of closed GOPs or open GOPs, the frame rate, the bitrate, the profile, the level, etc. If encoder settings are already defined or cannot be changed (e.g. in the case where the encoder settings are hard-coded), these settings are used for encapsulation settings. For example, distance between Intra-coded frames in video or length of groups of pictures may define the movie fragment duration. As another example, codec profile and level, frame resolution, framerate, etc. may be used by the encapsulated module for sample description, for example in sample entry in the SampleTableBox ('stsd') box. These parameters may be hard-coded in the server or writer (e.g. server or writer 300) or specified by users, for example through a command line, control scripts, or through a graphical user interface.

A first parameter that may be set during the configuration step and that may be considered as important is the distance between stream access points or switching points, referenced S_distance, in the sequence of frames. S_distance may also correspond to a time interval between two addressable objects from a streaming manifest (e.g DASH media segments or a first CMAF chunk in a CMAF fragment). It can be expressed as a duration or as a number of frames or samples. The stream access points or the switching points are preferably aligned across the different media streams, but they could also be desynchronized. When desynchronized, the difference is that the encapsulation module should keep in memory several S_distances instead of one. A second parameter that may be set during the configuration step and that may be considered as important is the fragment duration, for example in video streams corresponding to the length of a GOP. As for S_distance, in a preferred embodiment, it is the same for the different media streams and may be constant over time. However, the fragment duration may differ between the media streams thus requiring the encapsulation module to keep in memory these different fragment durations, per media stream or media stream type.

The settings are used to build initialization information of the media file. These items of information may be stored in the 'moov' box and its sub-boxes or in an initialization segment when the media file comes as one or more segment files. According to some embodiments of the invention, the 'moov' box contains a MovieExtendBox ('mvex') box indicating the presence of movie fragments.

Next, the encapsulation module starts reading the media data to encapsulate (step 410). The read data may be encoded data (e.g. encoded data 315 in FIG. 3), such as encoded video, encoded audio, text or subtitle information (not necessarily compressed), or even media data already encapsulated. The media data may come as portions, chunks, or bursts of data either corresponding to a frame, to a set of frames, or to a time interval. For example, for video, the burst of data may correspond to a group of pictures (GOP). For audio, it may correspond to a group of frames, possibly corresponding to the same time interval as a group of pictures. It may be the same for subtitles, timed text, or other data related to the media presentation.

Next, the encapsulation module checks whether the data read in step 415 correspond to data associated with timing information exceeding the current fragment duration. If some of these data correspond to data associated with timing information exceeding a current fragment duration, the data associated with timing information not exceeding the current fragment duration are appended to data previously read and stored in the current fragment and a new fragment is started (step 425). Alternatively, if these data do not correspond to data associated with timing information exceeding a current fragment duration, these data are appended to the current fragment (step 420).

Appending media data in a current fragment may consist in appending these media data in a media data box (e.g. in a 'mdat' box associated with a media stream or in a common 'mdat' box where media data are multiplexed) and in generating the corresponding sample description, mainly in a TrackRunBox ('trun') box (that may store items of information such as a sample size, a duration, etc.).

Finishing the current fragment may consist in completing the TrackRunBox box associated with this fragment and making available the so created movie fragment, for example for live streaming by uploading it into a network (e.g. network 330 in FIG. 3), or by answering to a client request (in the case according to which the server (e.g. server 300 in FIG. 3) also handles the streaming and when the client requests segments with HTTP chunked transfer encoding. HTTP chunked transfer encoding means that a media segment carrying the latest moment of the media presentation (also known as the "live edge time") could be consumed on the player while it's still being produced by the encoder and the packager.

Turning back to FIG. 4, starting a new fragment (step 425) may first consist in determining whether the read data to be stored in the new fragment contain a stream access point, a switching point, or an addressable object. A stream access point (SAP) is used for resynchronization or for seeking into the presentation. It is a video, audio, or data frame that is independently decodable and from which the presentation can be rendered (possibly with some artefacts at the beginning, during several frames, depending on encoding configurations and on the type of access points). This can be determined from the settings determined (e.g. step 400), by inspecting the types of frames in encoded media streams, or by inspecting sample description when media data are received as encapsulated data (in such a case, it can be determined, for example, from the 'sap' or 'rap' sample groups).

The presence of a stream access point, a switching point, or an addressable object may be determined at step 430 by comparing the timing or the read data versus the S_distance and the timing for the end of the fragment previously finished in step 425. If the timing for the new fragment is a multiple of the S_distance (i.e. if test 430 is true), then the encapsulation module starts a new independently parsable movie fragment (step 435). This may consist in resetting sample information, for example in sample groups, resetting sample auxiliary information, or resetting any sample information from the previous movie fragment. A new 'moof' box and its sub box are created, optionally with a 'tfdt' box indicating the decoding time for this new movie fragment. A 'sync' sample group may be created to indicate for example that the first sample of the movie fragment corresponds to a stream access point. Other sample groups may be created as well, for example a 'seig' sample group providing identifiers for encryption keys use to protect media samples. This is done for each media stream when the access points, switching points, or addressable objects are synchronized. When not synchronized, this step occurs independently for each media stream at different times. The remaining part of the read data is then appended to the created movie fragment.

Figure 6:
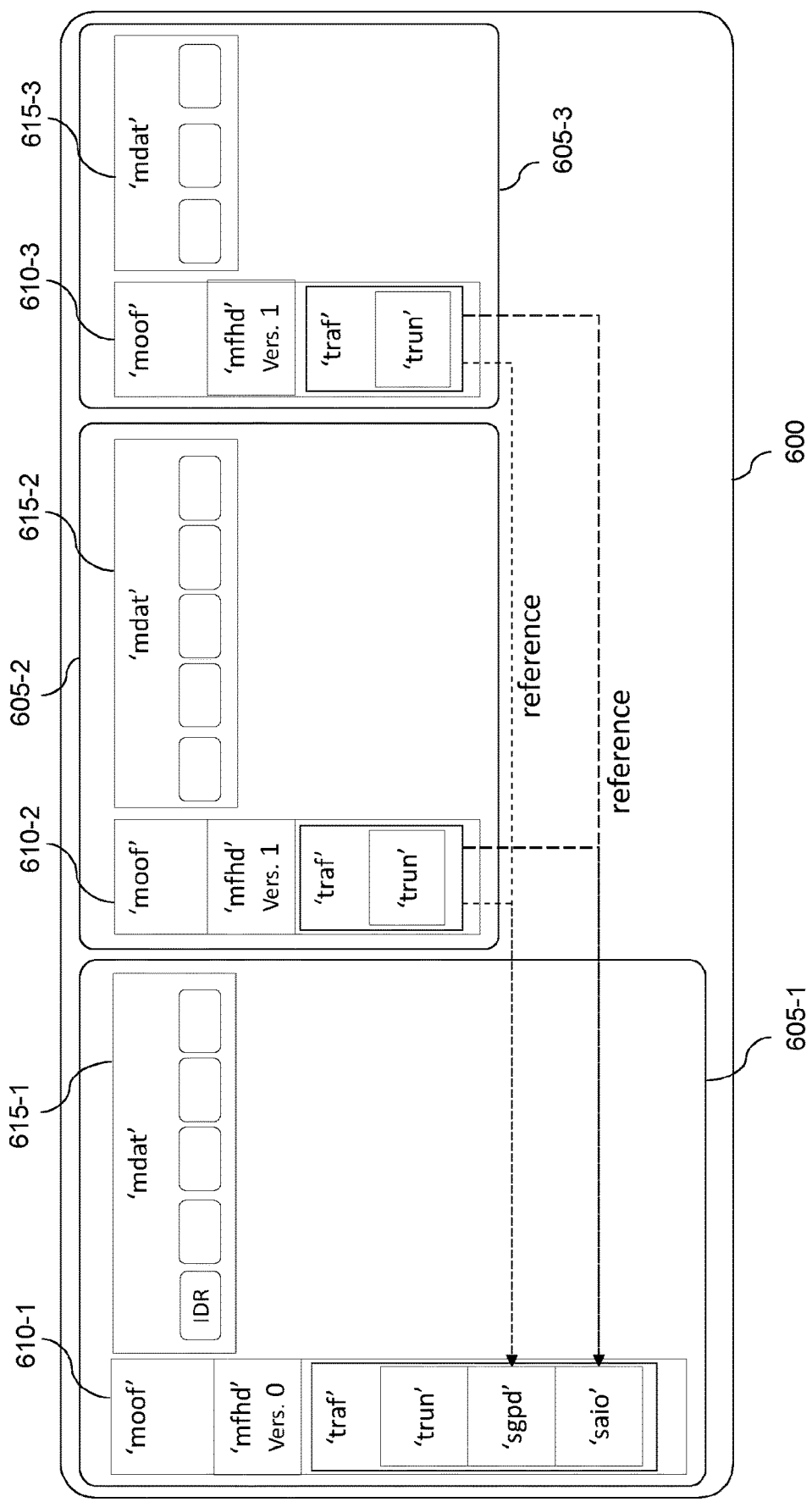
FIG. 6 illustrates an example of a media track mixing different types of movie fragments according to some embodiment of the invention.

According to some embodiments of the invention, the MovieExtendsBox box may also indicate that the file may contain two kinds of movie fragments (as explained in more details by reference to FIG. 6).

When the read data to store in the new fragment do not contain any stream access point, switching point, or addressable objects (i.e. if test 430 is false), a new non-independently parsable movie fragment is created, as described in more detail by reference to FIG. 6. It is to be noted that a non-independently parsable movie fragment can still be parsed, in terms of box structure and sample information, independently of the previous fragment, however its interpretation usually re-uses information from a previous movie fragment. It is noted that in some use cases a non-independently parsable fragment may start with a stream access point as long as the non-independently parsable fragment is not the first movie fragment in an ISOBMFF segment (or the first CMAF chunk in a CMAF fragment). For instance, in an indexed segment, the segment may start with a 'sidx' box that indexes all fragments within the segment. Accordingly, a client can have a direct-access to a non-independently parsable fragment starting with a SAP, by fetching the beginning of the segment (including the 'sidx' box when present and the first 'moof box') and the byte range of the non-independently parsable fragment.

Encapsulating media data in a non-independently parsable movie fragment means that the encapsulation module does not repeat the sample information collected from previous fragments in this new movie fragment. The non-independently parsable movie fragment may be signalled, for example, by defining a new version in the Movie Fragment HeaderBox.

As illustrated with step 445, the encapsulation process iterates until no more data are to be read and encapsulated.

Figure 5:
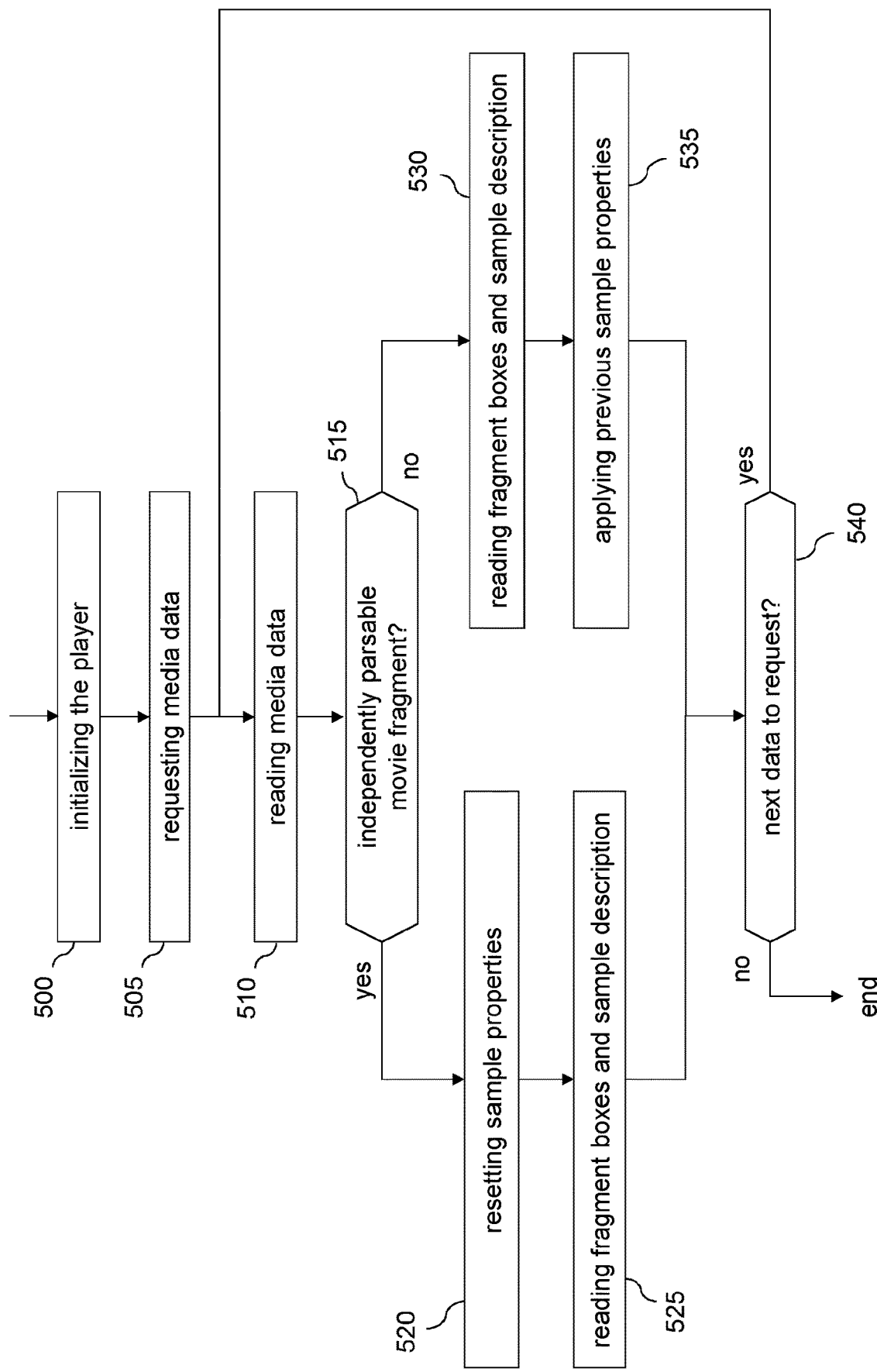
FIG. 5 illustrates an example of steps of a parsing process according to some embodiments of the invention.

FIG. 5 illustrates an example of steps of a parsing process according to some embodiments of the invention. Such a parsing process may be implemented in a client (the client may also be called an "application", a "media player", or a player).

As illustrated, a first step is directed to initializing the player (step 500). The player is initialized with information obtained by requesting an initialization segment or the beginning of a media file (e.g. first bytes), being noted that the player receives a media file or media segments files, possibly with a manifest file, generated according to some embodiments of the invention, for example as described by reference to FIG. 4. The URL or byte range for initialization data may be obtained from a manifest file like DASH MPD or a playlist for HTTP Live Streaming. The player then knows the kind of media present in the media presentation, the codecs in use, etc., and thus, it instantiates appropriate decoders accordingly.

Next, the player requests the media data (step 505).

Reception of media data can take different forms such as downloads, copies, streaming, or progressive transmission. When streamed (as illustrated with step 505), the streaming module implemented in the client (not represented) is in charge of requesting media file or segment files or parts of segment files (e.g. CMAF chunks), using a streaming manifest, and in charge of adapting the transmission. More precisely, the client issues a request to obtain media data, for example as chunks (using HTTP chunked transfer encoding) or as a whole segment. Preferably for live presentation, a chunk is requested so as to minimize the latency between the live media and the visualization. The client can issue request to chunks considering indication in the streaming manifest, for example like the availabilityStartTime parameter, the availabilityTimeOffset parameter, and the segment start time in DASH MPD.

In response to the request, data are received (step 510) and processed by the reader. Data are received as media segment files or parts of a media file or parts of media segment files, corresponding to movie fragments when chunks are requested or as a whole segment when a media segment is requested in step 505. These media data are parsed by the de-encapsulation module relying on the box hierarchy present in the media file or segment file as indicated by the brand information received in initialization step (step 500).

The reader then checks in step 515, for each track of the presentation, whether media data come as a an independently parsable movie fragment or not. If the received movie fragment is an independently parsable movie fragment, the reader processes the 'moof' and 'traf' boxes and their sub-boxes to obtain sample items of information like the size, the duration, and the offset in the 'mdat' box. All previous sample items of information possibly obtained from previous fragments are reset in step 520 (except parameters applying for the whole presentation, like default parameters for the fragments that may be defined in the 'trex' box or other parameters from the MovieFragmentHeaderBox box). Additional information like encryption keys may be obtained at the same step. This allows the reader to extract sample data that will be provided to the appropriate decoder. This depends on the type of tracks (e.g. video, audio, timed text, etc.) and on the codec in use as indicated in the sample entries and the decoder configuration record received in step 500. When a whole movie fragment is received, the corresponding media data may be passed to the corresponding decoder for rendering onto the client device.

If the obtained movie fragment is not an independently parsable movie fragment, then the reader starts reading this movie fragment (step 530), without resetting the previous sample items of information obtained from previous fragments (only new received parameter values replace previously received parameter values). The parsing of this movie fragment is then lighter and faster, since mostly the sample size, the duration, and the offset should be parsed, while the encryption keys, the sample group description, and possibly sample entries already parsed from previous fragments (step 525) could be reused to process the new samples in step 535. The determination of the type of movie fragments (independently parsable or not, step 515) may be obtained by using a specific indication, as described by reference to FIG. 6. Additional processing by the parser may also occur as also described by reference to FIG. 6.

Then, the player iterates to request and process further media data (either a next chunk or a next segment or seeking into the presentation) as illustrated with step 540. When reaching the end (determined from the manifest) or when no data is received, the process is stopped.

FIG. 6 illustrates an example of a media track mixing different types of movie fragments according to some embodiment of the invention. According to the illustrated example, segment 600 (or segment portion 600) comprises three movie fragments referenced 605-1, 605-2, and 605-3 that are of different types. According to some embodiments of the invention, the type of a movie fragment depends on whether an ISOBMFF parser can parse it without any previous information (i.e. independently parsable movie fragment or self-contained movie fragment type) or not (non-independently parsable movie fragment or non self-contained movie fragment type). For example, the type of movie fragment may depend on whether their first sample correspond to a stream access point, a switching point, or an addressable object for streaming usage of the file.

For the sake of illustration, movie fragment 605-1 is an independently parsable movie fragment, this means a movie fragment as defined until ISOBMFF 7th edition. Movie fragments 605-2 and 605-3 are non-independently parsable movie fragments. As described above, the amount of descriptive metadata in the 'moof' part of non-independently parsable movie fragments (e.g. 'moof' parts 610-2 and 610-3 of movie fragments 605-2 and 605-3) is lower than the amount of descriptive metadata of independently parsable movie fragments (e.g. moof part 610-1 of movie fragment 605-1), for the same number of samples, because the first sample of the independently parsable movie fragments (e.g. movie fragment 605-1) has to be independently coded, for example to provide a random access or a switching point or to be addressable.

Like any movie fragments, non-independently parsable movie fragments are made up of two parts: a metadata part (e.g. 'moof' part 610-2 or 610-3) and a media data part (e.g. 'mdat' part 615-2 or 615-3). The metadata part consists in ISOBMFF boxes and the media data consist in bytes within a media data box. The metadata part describes partially the samples of the media part (in opposition to independent movie fragments in which metadata part fully describes the samples of the media part). Indeed, some sample properties are not repeated in non-independently parsable movie fragments to avoid some description overhead. This is the reason why these movie fragments may be referred to as non-self-contained movie fragments or "dependent movie fragments".

The non-independently parsable movie fragments may be signalled in media files as a new version of MovieFragmentHeaderBox, for example, setting the version value to 1 (ISOBMFF 7th edition fixes it to 0):

```
aligned(8) class MovieFragmentHeaderBox
    extends FullBox('mfhd', version, 0) {
    unsigned int(32)sequence_number;
}
```

If the version field of the FullBox parameter of a movie fragment is not 0 (for example equals 1), parameter values of any SampleGroupDescriptionBox, SampleDescriptionBox, SampleAuxiliary InformationOffsetsBox, TrackBox (allowing dynamic tracks to be declared), or SubSampleInformationBox, MetaBox or UserDataBox boxes defined in the last movie fragment (in parsing order) or in the last track fragment in the last movie fragment whose Movie FragmentHeaderBox version is 0 (e.g. movie fragment 605-1) also apply for this movie fragment (e.g. movie fragment 605-2 or 605-3). There may be no SampleGroupDescriptionBox, SampleDescriptionBox (allowing dynamic sample entries to be declared), TrackBox (allowing dynamic tracks to be declared), or MetaBox defined for this movie fragment, these properties being inherited from previous movie fragment with version 0.

In a variant, the version 1 of the MovieFragmentHeaderBox provides a parameter indicating the type of movie fragment, independently parsable or not:

```
aligned(8) class MovieFragmentHeaderBox
    extends FullBox('mfhd', version, 0) {
    unsigned int(32)sequence_number;
    if (version > 0) {
        unsigned int (1) independently_parsable;
        unsigned int (7) reserved; (set to 0)
    }
}
```

The presence of this new type of movie fragments may also be indicated in the 'moov' box with a new version of the MovieExtendBox that indicates whether the media file contains this new type of movie fragments. In addition, or alternatively, a specific brand in the 'ftyp' box may be set to indicate the presence of at least one new type of movie fragment in the media file, or segment (when the brand appears in 'styp'). The brand may be also set at track level instead of being set at file level when only a subset of tracks in the presentation use this new type of movie fragments. Setting the brand at the track level may be relevant when alternative tracks exist that do not contain the new type of movie fragments.

According to some embodiments directed to encapsulation of video streams, the first frame in a non-independently parsable movie fragment should not start with an independently decodable frame (e.g. IDR, CRA pictures for MPEG codecs like HEVC, or VVC), i.e. providing a clean random access. Conversely, the first frame in an independently parsable movie fragment may start with an independently decodable frame (e.g. IDR, CRA pictures for MPEG codecs like HEVC, or VVC), as illustrated in FIG. 6 (the first frame of the 'mdat' part 615-1 starts with an IDR frame).

When a media file contains several tracks, with non-aligned SAPs, the indication of non-independently parsable movie fragment may be declared at 'traf' level, for example in a TrackFragmentHeaderBox ('tfhd') box.

The TrackFragmentHeader Box may be updated as follows:

```
aligned(8) class TrackFragmentHeaderBox
    extends FullBox('tfhd', version, tf_flags) {
    unsigned int(32)        track_ID;
    if (version >0) {
        unsigned int (1) independently_parsable;
        unsigned int (7) reserved; (set to 0)
    }
//          all the following are optional fields
//          their presence is indicated by bits in the tf_flags
    unsigned int(64)        base_data_offset;
    unsigned int(32)        sample_description_index;
    unsigned int(32)        default_sample_duration;
    unsigned int(32)        default_sample_size;
    unsigned int(32)        default_sample_flags;
}
``` where the independently_parsable parameter indicates whether the track fragment is independently parsable (when set to 1) or not (when set to 0). When the track fragment has this parameter set to 0, it may inherit some properties from a previous track fragment with the same track_ID.

In a variant, instead of a new version, a new tf_flags value is defined, for example 0x100000, that when set indicates a non-independently parsable track fragment.

This allows a movie fragment to mix both types of movie fragments, a first type for a track and another type for another track. The inheritance (for example of sample properties or track fragment timing or encryption information) then applies at 'traf' level, based on track_ID (i.e. samples in a 'traf' without SAP with track_ID=N may inherit properties from samples of the preceding 'traf' with SAP with track_ID=N). An alternative to signalling at track fragment level may be for some scenario to mandate one 'traf' box only per 'moof' box corresponding to non-independently parsable movie fragment, but this would reduce the efficiency of the description.

Of course, default parameters for movie fragments may still be used in the different types of movie fragments.

It is observed that the track fragment decoding time may become optional because it can be deduced from a previous movie fragment having one 'tfdt' indication (preferably on stream access points) and may no more be a requirement for CMAF files.

When a Movie fragment random access box ('mfra') is present in a file, its track fragment random access box ('tfra') when present may contain only offsets to the independently parsable movie fragments, the dependent movie fragments being excluded from these boxes, unless if they contain stream access points.

When the type of fragment is indicated at track fragment level, some rules on CMAF fragments may be relaxed like the repetition of default sample flags, sample flags, and first_sample flags in the TrackFragmentHeaderBox and/or TrackRunBox within each CMAF chunk and CMAF fragment. They may be updated or repeated in independently parsable track fragments and may be inherited in non-independently parsable track fragments.

Whatever level of signalling (movie fragment or track fragment level), the information inherited by non-independently parsable movie fragments from previous independently parsable movie fragments or track fragments may be explicitly indicated.

For example, by default from above description, a non-independently parsable movie fragments may inherit sample properties and timing properties from a previous independently parsable movie fragment and may not contain boxes under 'traf' declaring new properties. While this may be efficient to reduce the description overhead in non-independently parsable movie fragments, it may lead to an important number of independently parsable rmovie fragments (as soon as one property changes for example).

Some flexibility in the description of non-independently movie fragments may be considered for a more flexible approach. For example, movie fragments that are not independently parsable may have descriptive information that indicate whether:

- they may inherit properties from a previous independently parsable movie fragment but may also redefine properties. In this case, the redefined properties override the previous properties with same type from previous movie fragment from which the fragment inherits. For example, the type of a property may correspond to a grouping_type and to an entry in a 'sgpd' box, or a 'subs' box with same codec_specific_parameters value and flags values or to a specific box (for example a 'meta' or 'udta' box). Such movie fragment may be indicated by the non_independent_overriding type (this name being just given as an example),
- another type of movie fragment may indicate which properties are inherited (for example listing the 4CC of the boxes inherited), the others being possibly redefined with new boxes under a 'traf' box. Such movie fragment may be indicated by the non_independent-_explicit_inheritance type (this name being just given as an example),
- another type of movie fragment may indicate that it inherits properties from a previous movie fragment but that some properties may need to be re-evaluated considering samples of the reference movie fragment (onto which this fragment depends). This may be the case for timing information; for example when the 'tfdt' box is not repeated but inherited. This type of fragment indicates that the content of the 'tfdt' box should be recomputed considering the sample durations from previous fragment(s). Such movie fragment may be indicated by the non_independent_reevaluate type (this name being just given as an example), and
- another type of movie fragment may indicate the previous fragment(s) to be used for properties inheritance. This may be indicated by a specific type, for example the non_independent_multi_inheritance type (this name being just given as an example) with a list of reference movie fragments from which to inherit. The list may consist in indicating the sequence_number of the fragment for movie fragment level dependency or as a pair of (sequence_number, track_ID) for track fragment level dependency. For each entry (referenced movie fragment), a list of properties may be indicated, for example 4CC of the box to reuse or 4CC with grouping_type or any parameter within a box that helps identifying a property for samples of the track fragment to inherit from.

The different types of movie fragments considered above may be declared in a movie fragment header box, for example using a new version with a type parameter indicating one of the above types. This may be convenient when all track fragments within a movie fragment are of the same type. When this is not the case, preferably the movie fragment type is rather indicated in a new version of the track fragment header box, for example using the reserved bits proposed in the extended TrackFragmentHeaderBox above:

```
aligned(8) class TrackFragmentHeaderBox
                extends FullBox('tfhd', version, tf_flags) {
    unsigned int(32)        track_ID;
    if (version >0) {
                unsigned int (8) fragment_type;
    }
//              all the following are optional fields
//              their presence is indicated by bits in the tf_flags
    unsigned int(64)        base_data_offset;
    unsigned int(32)        sample_description_index;
    unsigned int(32)        default_sample_duration;
    unsigned int(32)        default_sample_size;
    unsigned int(32)        default_sample_flags;
}
``` where the fragment_type parameter indicates the type of the track fragment. It may correspond take values from a list of predefined, authorized types, for example defined in a standard specification or by a registration authority. Similarly, an indication of fragment type at movie fragment level may be indicated in media file as follows:

```
aligned(8) class MovieFragmentHeaderBox
        extends FullBox('mfhd', version, 0) {
    unsigned int(32)sequence_number;
    if (version > 0) {
        unsigned int (8) fragment_type;
    }
}
```

ISOBMFF, through SegmentIndexBox, provides a compact index of one media stream within the media segment to which it applies. This indexation of media segments, for example in a new version of the SegmentIndexBox ('sidx') box may take into account the types of movie fragments. For example, a new value for reference_type may be defined (for example the value 2) to index non-independently parsable movie fragments. The reference_type with value 0 would indicate that an entry of the index references media content, typically in a 'moof' box. The independently parsable movie fragments would still be indexed with a reference_type equal to 0.

A hierarchical segment index, as described in ISOBMFF, may also be used with a first entry referencing an independently parsable movie fragment, for example the first of a media segment or CMAF Fragment) and a second entry referencing non independently parsable movie fragments (for example the remaining ones in a media segment or CMAF Fragment). When the new version of the 'sidx' box is used, the second entry has a reference_type equal to 2 while the first entry has a reference_type equal to 0.

It may also be possible to index different types of movie fragments with the current version of 'sidx' box. In such a case, all movie fragments are still referenced with a reference_type equal to 0 and a fragment type indication at movie fragment level or at track fragment level may indicate to a parser if it is an independently parsable movie fragment or not. Moreover, the starts_with_SAP parameter still applies whatever the version of the 'sidx' box to indicate whether the first sample of a movie fragment is a SAP or not. Having the type of movie fragment in the segment index box, for example through a reference_type is an indication to parser whether they can start from an entry of the index (when referencing an independently parsable fragment) or if they should rather check for a previous independently parsable fragment (when referencing a non-independently parsable fragment).

The 'sidx' box may also be constrained, for example through a flag value, to index only independently parsable movie fragments. With this constraint set, the 'sidx' box provides the byte offsets to independently parsable fragments. The referenced_size in this case may indicate the length in bytes between two consecutive independently parsable fragments (i.e. the size of the independently parsable fragment and its following non-independently parsable fragments). Possibly, each following non-independently parsable fragment may be further indexed in a 'ssix' box with a new level assignment value (for example value 5) indicating that a level contains a movie fragment. Then, each entry in the 'ssix' box corresponds to one movie fragment.

There may be extensions to movie fragments allowing new sample entries or new tracks to be declared in a movie fragment. It may be relevant to define a movie fragment type (either at movie fragment level or at track fragment level) indicating whether the movie fragment introduces new sample entries or tracks. When introducing a new track or a new sample entry, the movie fragment should also be declared as an independently parsable movie fragment. When a new track or a sample entry needs to be declared in a media presentation, an independently parsable movie fragment is declared (for example as another criterion in step 430 in FIG. 4). The non-independently parsable movie fragments may not contain any declaration of dynamic tracks through a TrackBox or any declaration of new sample entries.

When access points in fragmented ISOBMFF media files are not aligned across tracks, the fragment duration may vary from one track fragment to another. Since tracks may be multiplexed into the same movie fragment (i.e. a 'moof' box may contain multiple 'traf' boxes), it is proposed to indicate the fragment duration at track fragment level rather than at movie fragment level.

According to some embodiments of the invention, the 'moov' box contains a MovieExtendBox indicating the presence of movie fragments. Still according to some embodiments of the invention, the MovieExtendsHeaderBox 'mehd' box within this MovieExtendsBox may comprise an indication to signal that the fragment duration is the same for all the media streams and constant over time. In the case according to which the fragment duration is constant along the media presentation but differs from one media stream to another, such an indication may be signalled in a modified TrackExtendBox in the MovieExtendsBox. For example the syntax of the TrackExtendBox may include new syntax element as follows (in bold):

```
aligned(8) class TrackExtendsBox extends FullBox('trex', version,
0) {
    unsigned int(32)track_ID;
    unsigned int(32)default_sample_description_index;
    unsigned int(32)default_sample_duration;
    unsigned int(32)default_sample_size;
    unsigned int(32)default_sample_flags;
    if (version == 1) unsigned int (32) fragment_duration;
}
```

The TrackExtendsBox may also be extended using a flag value instead of a new version. It may also be extended with different version numbers to allow 64-bit fragment duration indication. For example, version 1 provides fragment duration on 32-bit while a version 2 provides fragment duration on 64 bits. However, encapsulating media stream in fragmented files for low latency purpose may result in a short fragment duration, thus 32 bit or even 16 bits may be sufficient to code the fragment_duration value. The semantics for fragment_duration is the same as in MovieExtendsHeaderBox except that it applies to fragments of a given track, the one identified by track_ID. It may override, when present in the 'traf' box, a value possibly present in the MovieExtendsHeaderBox for a given track. When not present, the value possibly present in MovieExtendsHeaderBox applies. In a particular embodiment, when fragment_duration is described per track fragment (e.g. in the TrackExtendBox) the value of fragment_duration in the MovieExtendsHeaderBox may be equal to 0. This indicates to parsers that the fragment durations may differ per track of the media file. In a variant, where fragment duration is indicated at track fragment level, the fragment_duration of the MovieExtendsHeaderBox is set equal to the highest value of the fragment_duration within all the tracks of the media presentation. This requires parsers to systematically check for presence of a fragment duration at track fragment level and possibly store a duration per track fragment.

The indication of fragment duration at track fragment level may be used in any version or any type of movie fragments, whether they are independently parsable movie fragments or non-independently parsable movie fragments.

Figure 7:
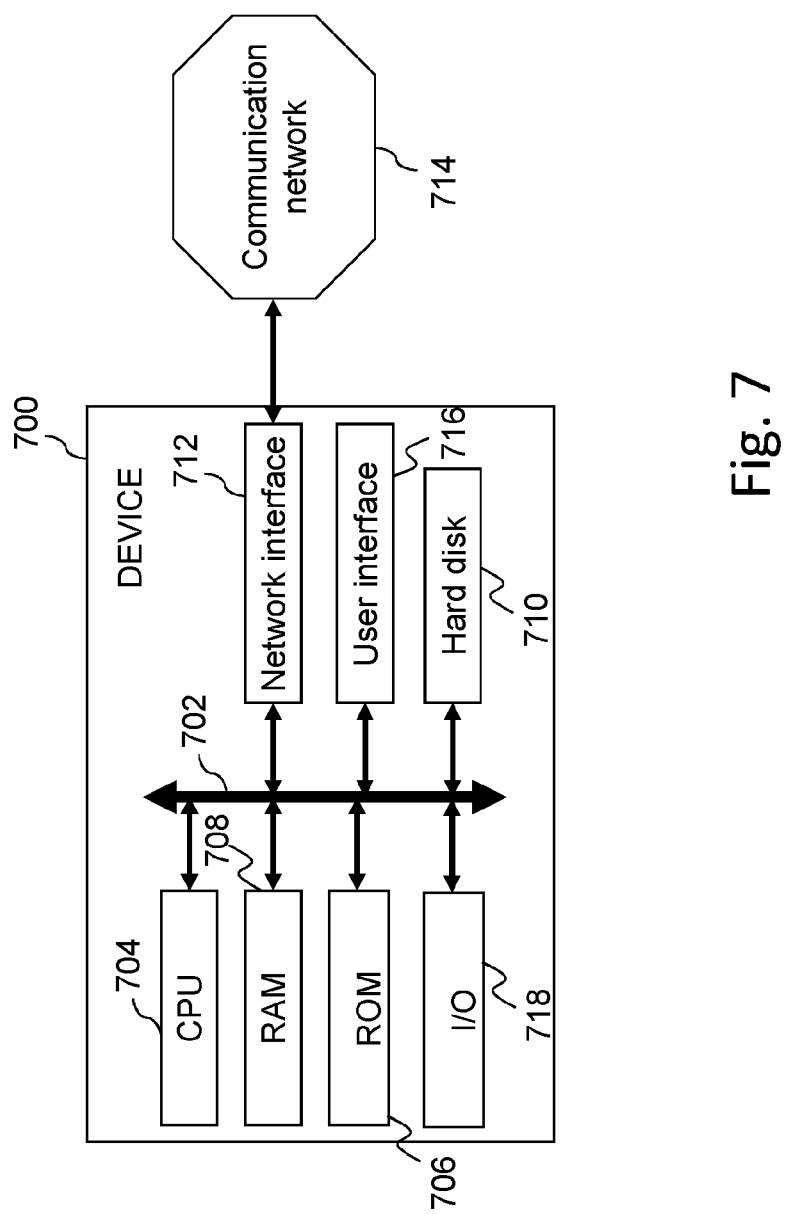
FIG. 7 schematically illustrates a processing device configured to implement at least one embodiment of the present invention.

FIG. 7 is a schematic block diagram of a computing device 700 for implementation of one or more embodiments of the invention. The computing device 700 may be a device such as a micro-computer, a workstation, or a light portable device. The computing device 700 comprises a communication bus 702 connected to:

- a central processing unit (CPU) 704, such as a microprocessor;
- a random access memory (RAM) 708 for storing the executable code of the method of embodiments of the invention as well as the registers adapted to record variables and parameters necessary for implementing the method for encapsulating, indexing, de-encapsulating, and/or accessing data, the memory capacity thereof can be expanded by an optional RAM connected to an expansion port for example;
- a read only memory (ROM) 706 for storing computer programs for implementing embodiments of the invention;
- a network interface 712 that is, in turn, typically connected to a communication network 714 over which digital data to be processed are transmitted or received. The network interface 712 can be a single network interface, or composed of a set of different network interfaces (for instance wired and wireless interfaces, or different kinds of wired or wireless interfaces). Data are written to the network interface for transmission or are read from the network interface for reception under the control of the software application running in the CPU 704;
- a user interface (UI) 716 for receiving inputs from a user or to display information to a user;
- a hard disk (HD) 710; and/or
- an I/O module 718 for receiving/sending data from/to external devices such as a video source or display.

The executable code may be stored either in read only memory 706, on the hard disk 710 or on a removable digital medium for example such as a disk. According to a variant, the executable code of the programs can be received by means of a communication network, via the network interface 712, in order to be stored in one of the storage means of the communication device 700, such as the hard disk 710, before being executed.

The central processing unit 704 is adapted to control and direct the execution of the instructions or portions of software code of the program or programs according to embodiments of the invention, which instructions are stored in one of the aforementioned storage means. After powering on, the CPU 704 is capable of executing instructions from main RAM memory 708 relating to a software application after those instructions have been loaded from the program ROM 706 or the hard-disc (HD) 710 for example. Such a software application, when executed by the CPU 704, causes the steps of the flowcharts shown in the previous figures to be performed.

In this embodiment, the apparatus is a programmable apparatus which uses software to implement the invention. However, alternatively, the present invention may be implemented in hardware (for example, in the form of an Application Specific Integrated Circuit or ASIC).

Although the present invention has been described hereinabove with reference to specific embodiments, the present invention is not limited to the specific embodiments, and modifications will be apparent to a person skilled in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method for encapsulating media data as a plurality of fragments of one or more media files, each of the fragments comprising a metadata part and a media data part, metadata of the metadata part describing encapsulation of the media data in the media data part, the method being carried out by a server and comprising:
    obtaining second media data to be encapsulated within a second fragment,
    obtaining second metadata describing encapsulation of the second media data,
    determining that some of the second metadata describing encapsulation of the second media data are identical to some of first metadata belonging to a first fragment and describing encapsulation of first media data within the first fragment, and
    if some of the second metadata describing encapsulation of the second media data are identical to some of the first metadata describing encapsulation of the first media data and if the second fragment is not to be parsed independently, encapsulating the second media data and a portion of the second metadata within the second fragment, the second fragment further comprising an indication to signal that the metadata part of the second fragment comprises only a portion of the metadata required to parse the media data of the second fragment.

2. The method of claim 1, further comprising determining that the second fragment is not to be parsed independently, determining that the second fragment is not to be parsed independently being based on fragment duration.

3. The method of claim 2, wherein the fragment duration is determined as a function of a latency for a client to receive fragments.

4. The method of claim 2, wherein the fragment duration is determined as a function of synchronization points for decoding the encapsulated media data.

5. The method of claim 2, wherein determining that the second fragment is not to be parsed independently further comprises comparing a timing item of information of the second media data with timing item of information of previously encapsulated media data.

6. The method of claim 5, wherein the timing item of information of the second media data and of previously encapsulated media data are compared with a threshold to control positions of random-access points, stream access points, or stream switching points within media data.

7. The method of claim 1, wherein the first and second metadata are stored in 'moof' boxes as defined in ISOBMFF.

8. The method of claim 1, wherein the indication is stored as a version of a structure of the metadata part of the second fragment.

9. The method of claim 1, wherein the fragments are Common Media Application Format, CMAF, chunks.

10. The method of claim 1, wherein the first and the second fragments belong to a same media file.

11. A method for parsing encapsulated media data, the media data being encapsulated as a plurality of fragments of one or more media files, each of the fragments comprising a metadata part and a media data part, metadata of the metadata part describing encapsulation of the media data in the media data part, the method being carried out by a client and comprising:
    obtaining a first fragment comprising first media data and first metadata,
    parsing the first media data as a function of the first metadata,
    obtaining a second fragment comprising second media data and second metadata, the second fragment further comprising an indication to signal that the metadata part of the second fragment comprises only a portion of the metadata required to parse the media data of the second fragment, and
    upon determining that the second fragment cannot be parsed independently, parsing the second media data as a function of the first metadata and of the second metadata.

12. The method of claim 11, further comprising resetting current metadata describing encapsulation of media data if encapsulated media data to parse belong to a fragment that can be parsed independently.

13. The method of claim 11, further comprising replacing a subset of metadata describing encapsulation of media data if current encapsulated media data to parse belong to a fragment that cannot be parsed independently.

14. The method of claim 11, wherein the first and second metadata are stored in 'moof' boxes as defined in ISOBMFF.

15. The method of claim 11, wherein the indication is stored as a version of a structure of the metadata part of the second fragment.

16. The method of claim 11, wherein the fragments are Common Media Application Format, CMAF, chunks.

17. The method of claim 11, wherein the first and the second fragments belong to a same media file.

18. A non-transitory computer-readable storage medium storing instructions of a computer program for implementing the method according to claim 1.

19. A processing device comprising a processing unit configured for carrying out each step of the method according to claim 1.

* * * * *